(12) United States Patent
McNicol (10) Patent No.: US 8,774,646 B2
(45) Date of Patent: Jul. 8, 2014

(54) ADAPTIVELY BALANCED DETECTOR

(76) Inventor: John D. McNicol, Ottawa (CA)

( * ) Notice: Subject to any disclaimer, the term of this patent is extended or adjusted under 35 U.S.C. 154(b) by 423 days.

(21) Appl. No.: 13/078,157

(22) Filed: Apr. 1, 2011

(65) Prior Publication Data

US 2012/0251118 A1     Oct. 4, 2012

(51) Int. Cl.
    *H04B 10/61*         (2013.01)

(52) U.S. Cl.
    USPC .......................................... 398/209; 398/210

(58) Field of Classification Search
    CPC ........................................... H04B 10/61–10/64
    USPC .................................................. 398/209, 210
    See application file for complete search history.

(56) References Cited

U.S. PATENT DOCUMENTS

2011/0129230 A1*    6/2011    Zanoni et al. ................. 398/140

\* cited by examiner

*Primary Examiner* — Shi K Li
(74) *Attorney, Agent, or Firm* — David L. Soltz (57) ABSTRACT

Consistent with the present disclosure, a coherent detector is provided that includes an optical hybrid that supplies optical signals including local oscillator light to a balanced detector. The amount of imbalance or "balance error" in the balanced detector is identified by comparing an output of the balanced detector and an output of a photodiode that receives a portion of an input optical signal provided to the optical hybrid. Based on the balance error, electrical signals generated by the balanced detector or the power of optical signals passing through (or output from) the optical hybrid circuit can be adjusted so that the balance error is minimized or reduced to zero. As a result, imbalance associated with the balanced detector is corrected so that unwanted currents and/or related electrical signals are cancelled out or substantially cancelled out. Such unwanted currents and/or related electrical signals are generated in response to noise in the local oscillator light as well as intensity noise associated with non-selected optical signals in a superchannel.

7 Claims, 10 Drawing Sheets

ADAPTIVELY BALANCED DETECTOR

BACKGROUND

Optical communication systems are known in which optical signals carrying data are transmitted from a first node to a second or receive node over an optical fiber. Often the optical signals, each having a corresponding wavelength, are combined onto an optical fiber to provide a wavelength division multiplexed (WDM) optical signal. At the receive node, the optical signals in the WDM optical signal are optically demultiplexed and converted into corresponding electrical signals, which are then further processed.

Recently, optical communication systems have been deployed in which so-called "superchannels" are transmitted. Each superchannel includes a plurality of optical signals or a group of channels that are relatively close to one another in wavelength. Multiple superchannels can be transmitted and combined onto an optical fiber, and each superchannel may be routed or directed through the optical communication system as an individual channel or optical signal. At the receive node, instead of separating an incoming signal into individual channels, each having a single wavelength, the combined superchannels are separated into individual superchannels, each having a plurality of optical signals, and each optical signal having a corresponding one of a plurality of wavelengths.

Often the data carried by each optical signal in a superchannel may be separated in the electronic domain using coherent detection. Namely, a light source or laser, also referred to as a local oscillator, is provided at the receive node. The incoming superchannel, which, if polarization multiplexed, may be split by a polarization beam splitter (PBS) into two orthogonal signals having, for example, transverse electric (TE) and transverse magnetic (TM) polarizations, respectively. Each superchannel, one having a TE polarization and the other having a TM polarization, output from the PBS is combined with the light output from the local oscillator and may be passed through a 90-deg optical hybrid circuit. The optical hybrid circuit, in turn, outputs further optical signals to "balanced" photodetectors, which, in turn, generate corresponding electrical signals. The electrical signals, which are in analog form, may then be amplified by a transimpedance amplifier, and then converted to corresponding digital signals by analog-to-digital converter (ADC) circuitry for further processing.

As generally understood, balanced detectors include pairs of photodiodes, which generate corresponding electrical currents in response to the received optical signals from the optical hybrid circuit. The photodiodes are connected to one another in series in such a manner that the current generated by one is subtracted from the current generated by other. As a result, components of the generated currents associated with the noise in the local oscillator light as well as the non-selected optical signals in the superchannel are cancelled out. The resulting output from the photodetector advantageously includes an electrical signal having a frequency equal to or substantially equal to the difference between the selected optical signal in the superchannel and the local oscillator light. Accordingly, the output may be referred to as a "down converted" signal, which carries the data supplied by the transmitter, but at a frequency significantly less than that associated with optical frequencies. Such down converted signals may be readily demodulated to extract the data.

Balanced detection typically requires that the currents generated by each photodiode be "balanced", i.e., that the DC (direct current) component of each be the same. For example, the photodiodes in the balanced detector should preferably be identical. Typically, however, due to non-idealities associated with the photodiodes, the optical hybrid circuit, and/or other components, such balanced detection may not be achieved. In other words, detection is "imbalanced". That is, the DC component of the current generated by one photodiode does not equal that generated by the other photodiode in the balanced detector. For example, due to semiconductor processing variations, one photodiode may be larger than the other and thus may supply a disproportionate amount of current. As a result, the components of such current associated with the local oscillator light and the non-selected optical signals in the superchannel may be not cancel out.

Detector imbalance can increase the amount of interference due to the presence of other signals in the superchannel being supplied to the photodiodes. In particular, the ratio of channel to interference (C/I) is proportion to the following:

$$2 \text{ dB} + LO/\text{desired signal} - 20 \log 10(K) - 10 \log 10(1 + \text{number of adj chs})$$

In the above formula, LO is the intensity of the light output from the local oscillator, "desired signal" is the intensity of the selected optical signal to be detected, K is an amount of imbalance, and "number of adj chs" is the number of channels or signals in the superchannel. Thus, based on the above formula, by reducing "K", C/I can be increased or improved and the data carried by the selected optical signal may be more accurately recovered. Alternatively, an effective gain can be realized in connection with such optical signal, thereby improving system performance.

There is a need, therefore, to provide a receive node that can improve the C/I ratio in the presence of detector imbalance.

SUMMARY OF THE INVENTION

Consistent with the present disclosure, an apparatus is provided that comprises an optical coupler having an input and first and second outputs, the input receiving a wavelength division multiplexed (WDM) optical signal. The WDM optical signal includes a plurality of optical channels each having a corresponding one of a plurality of wavelengths. The first output supplies a first portion of the WDM optical signal and the second output supplies a second portion of the WDM optical signal. A first photodiode is also provided that is configured to receive the first portion of the WDM optical signal and supply a first electrical signal. In addition, an optical hybrid circuit is provided that is configured to receive at least a part of the second portion of the WDM optical signal. Further, a laser is provided that is configured to supply a local oscillator optical signal to the optical hybrid circuit, such that the optical hybrid optical circuit supplies first and second optical outputs. Moreover, an output circuit and process circuit are included. The output circuit includes second and third photodiodes that receive the first and second optical outputs, respectively. The output circuit supplies a second electrical signal. The processor circuit adjusts at least one of a current and voltage of the second electrical signal in response to the first electrical signal and the second electrical signal.

Consistent with an additional aspect of the present disclosure, an apparatus is provided that includes an optical coupler having an input and first and second outputs, the input receiving a wavelength division multiplexed (WDM) optical signal. The WDM optical signal includes a plurality of optical channels each having a corresponding one of a plurality of wavelengths. The first output supplies a first portion of the WDM optical signal and the second output supplies a second portion of the WDM optical signal. The first photodiode is configured to receive the first portion of the WDM optical signal and supply a first electrical signal. An optical hybrid circuit is provided that is configured to receive at least a part of the second portion of the WDM optical signal. In addition, a laser is provided that is configured to supply a local oscillator optical signal to the optical hybrid circuit, such that the optical hybrid optical circuit supplies first and second optical outputs. Also, an output circuit is provided that includes second and third photodiodes that receive the first and second optical outputs, respectively, the output circuit supplying a second electrical signal. The output circuit includes a first low pass filter circuit configured to supply a first filtered output in response to the first electrical signal, and a first analog-to-digital conversion circuit that receives the first electrical signal and supplies a first digital output. The output circuit also includes a second low pass filter circuit that supplies the second electrical signal, and a second analog-to-digital circuit configured that receives the second electrical signal and supplies a second digital output. A processor circuit is provided that adjusts at least one of a current and voltage of the second electrical signal in response to the first and second digital outputs.

Consistent with a further aspect of the present disclosure, an apparatus is provided that comprises an optical splitter configured to receive a wavelength division multiplexed (WDM) optical signal. The optical splitter has a first output configured to supply a first portion of the WDM optical signal and a second output configured to supply a second portion of the WDM optical signal, the WDM optical signal including a plurality of optical channels each having a corresponding one of a plurality of wavelengths. An optical coupler is also provided that has an input and first and second outputs. The input receives the first portion of the WDM optical signal, and the first output of the optical coupler supplies a first part of the first portion of the WDM optical signal constituting a first partial optical signal. The second output of the optical coupler supplies a second part of the WDM optical signal constituting a second partial optical signal. A first photodiode is provided that is configured to receive the first partial optical signal and supply a first electrical signal. Also, a first optical hybrid circuit is provided that is configured to receive at least a portion of the second partial optical signal. A first laser is further provided that is configured to supply a first local oscillator optical signal to the first optical hybrid circuit, such that the first optical hybrid optical circuit supplies first and second optical outputs. Moreover, an output circuit is provided that includes second and third photodiodes that receive the first and second optical outputs, respectively, the output circuit supplying a second electrical signal. In addition, a processor circuit is included that adjusts at least one of a current and voltage of the second electrical signal in response to the first electrical signal and the second electrical signal. Further, a second optical hybrid circuit is provided that is configured to receive at least part of the second portion of the WDM optical signal, and a second laser is provided that is configured to supply a second local oscillator optical signal the second optical hybrid circuit.

Consistent with an additional aspect of the present disclosure, an apparatus is provided that includes an optical splitter configured to receive a wavelength division multiplexed (WDM) optical signal. The optical splitter has a first output configured to supply a first portion of the WDM optical signal and a second output configured to supply a second portion of the WDM optical signal, the WDM optical signal including a plurality of optical channels each having a corresponding one of a plurality of wavelengths. An optical coupler is also provided that has an input and first and second outputs. The input receives the first portion of the WDM optical signal, and the first output of the optical coupler supplies a first part of the first portion of the WDM optical signal constituting a first partial optical signal. The second output of the optical coupler supplies a second part of the WDM optical signal constituting a second partial optical signal. A first photodiode is provided that is configured to receive the first partial optical signal and supply a first electrical signal, and a first optical hybrid circuit is provided that is configured to receive at least a portion of the second partial optical signal. A first laser supplies a first local oscillator optical signal to the first optical hybrid circuit, such that the first optical hybrid optical circuit supplies first and second optical outputs. In addition, a first output circuit is provided that includes second and third photodiodes that receives the first and second optical outputs, respectively, the first output circuit supplying a second electrical signal. Moreover, a first processor circuit is provided that adjusts at least one of a current and voltage of the second electrical signal in response to the first electrical signal and the second electrical signal. Further, a second optical hybrid circuit is provided that is configured to receive at least part of the second portion of the WDM optical signal, and a second laser is provided that is configured to supply a second local oscillator optical signal to the second optical hybrid circuit, such that the second optical hybrid optical circuit supplies third and fourth optical outputs. Also, a second output circuit is provided that includes fourth and fifth photodiodes that receive the third and fourth optical outputs, respectively, the second output circuit supplying a third electrical signal. In addition, a second processor circuit us provided that adjusts at least one of a current and voltage of the third electrical signal in response to the first electrical signal and the third electrical signal.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure and together with the description, serve to explain the principles of the invention.

DESCRIPTION OF THE EMBODIMENTS

Consistent with the present disclosure, a coherent detector is provided that includes an optical hybrid that supplies optical signals to a balanced detector. The amount of imbalance or "balance error" ("K" in the above formula) in a balanced detector is identified by determining a difference between an output the balanced detector and an output of a photodiode that receives a portion of an input optical signal provided to the optical hybrid. Based on the balance error, electrical signals generated by the balanced detector or the power of optical signals passing through (or output from) the optical hybrid circuit can be adjusted so that the balance error is minimized or reduced to zero. At this point, imbalance in the balanced detector is corrected so that components of the generated photodiode currents associated with noise in the local oscillator light, as well as the non-selected optical signals in the superchannel, are cancelled out.

Reference will now be made in detail to the present exemplary embodiments, examples of which are illustrated in the accompanying drawings. Wherever possible, the same reference numbers will be used throughout the drawings to refer to the same or like parts.

Figure 1:
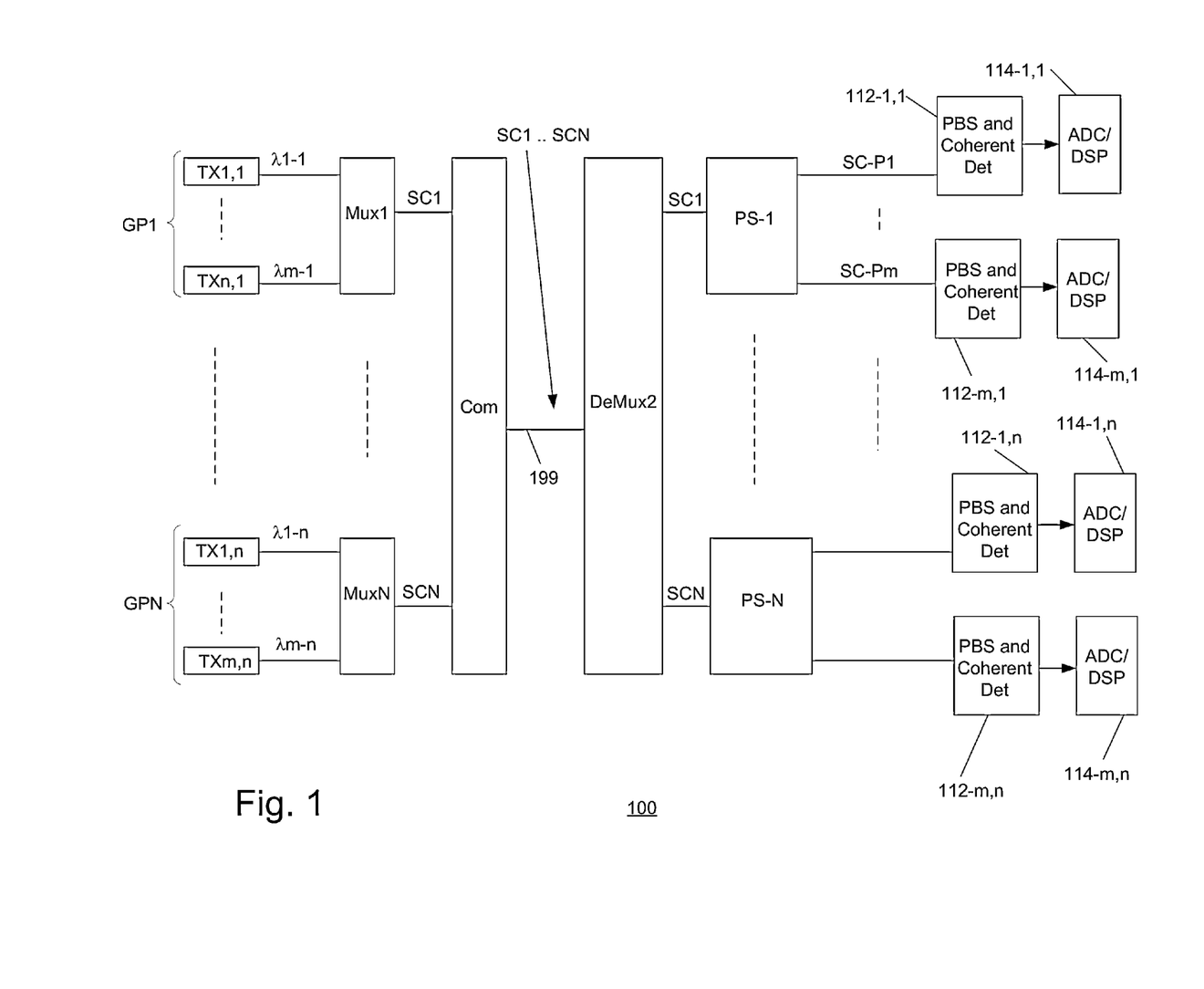
FIG. 1 illustrates an example of an optical communication system consistent with the present disclosure.

FIG. 1 illustrate an example of an optical communication system 100 consistent with the present disclosure. Optical communication system 100 includes a plurality of transmitter groupings GP-1 to GP-N, each of which including a corresponding plurality of group of optical transmitters. For example, transmitter grouping GP-1 includes transmitters TX1,1 to TXm,1 and transmitter grouping GP-N includes transmitters TX1 to TXm,N. Each transmitter within a grouping, such as GP-1, supplies a corresponding one of a plurality of wavelengths. Accordingly, as further shown in FIG. 1, each of transmitters TX1,1 to TXm,1 output a corresponding optical signal, and each optical signal has a corresponding one of wavelengths λ1-1 to λm-1. In addition, for example, each of transmitters TX1,N to TXm,N supplies a corresponding optical signal, and each optical signal has a corresponding one of wavelengths λ1-N to λm-N. Optical signals having wavelengths λ1-1 to λm-1 are combined by multiplexer Mux1 to provide an optical signal grouping of optical signals that are spectrally close in wavelength or superchannel (SC1), and optical signals λ1-N to λm-N are combined by multiplexer MuxN to provide superchannel SCN. In a similar fashion, transmitters in remaining groupings (not shown) output optical signals at different wavelengths, and such optical signals are combined by corresponding multiplexers selected from Mux2 to MuxN-1 to provide additional superchannels. Each optical signal wavelength in a given superchannel may be spectrally spaced from an adjacent optical signal wavelength by less than 25 GHz, for example. In addition, each optical signal in a superchannel may be polarization multiplexed. For example an optical signal in superchannel SC1 may include light having a first or TE polarization that is modulated to carry first and second data streams, and light having a second or TM polarization that is modulated to carry third and fourth data streams. One exemplary modulation format is quadrature phase shift keying (QPSK), although other modulation formats may be used, such as on-off keying (OOK), binary phase shift keying (BPSK), and other higher order (m-ary) modulation formats (e.g., 8-quadrature amplitude modulation "8-QAM").

Exemplary transmitters are discussed in greater detail in U.S. patent application Ser. No. 12/897,784, filed Oct. 4, 2010, and U.S. patent application Ser. No. 12/981,814 filed Dec. 30, 2010, the entire contents of both of which are incorporated herein by reference.

As further shown in FIG. 1, each superchannel SC1 to SCN is provided to an optical combiner COM, which combines and supplies the superchannels onto an optical communication path 199, which may include one or more segments of known optical fiber, as well as optical amplifiers and/or other known optical components. Multiplexers Mux1 to MuxN, and optical combiner may include known optical multiplexers, such as arrayed waveguide gratings (AWGs), interleavers, and/or optical filters.

Demultiplexer 189 receives superchannels SC1 to SCN, and separates the superchannels, such that each superchannel is supplied to a corresponding one of optical power splitters PS-1 to PS-N. Each power splitter, in turn, supplies a power split portion (e.g., SC-P1 to SC-Pm) of each optical signal within a superchannel to a corresponding one of circuit blocks 112-1,1 to 112-$m$,1 ... 1121,$n$ to 112-$m$,$n$ (collectively "circuit blocks 112"). Thus, for example, superchannel SC1 may be supplied to power splitter PS-1, which supplies a power split portion of each optical signal in SC1 to a corresponding one PBS (polarization beam splitter) and coherent detector blocks 112-1,1 to 112-$m$,1. Similarly, superchannel SCN may be supplied to power splitter PS-N, which supplies a power split portion of each optical signal in SCN to a corresponding one r blocks 112-1,$n$ to 112-$m$,$n$. Each of circuit blocks 112 may include circuitry configured to reduce imbalance of a balanced detector, as discussed in greater detail below.

In one example, each of circuit blocks 112 supplies analog signals corresponding to the in-phase and quadrature components of each polarization (e.g., TE and Tm) associated with a given optical signal in a superchannel. These analog signals may be converted to corresponding digital signals by analog to digital conversion (ADC) circuitry and then further processed by digital signal processor (DSP) circuitry, collectively referred to as ADC/DSP blocks. In one example, each of ADC/DSP blocks 114-1,1 to 114-$m$,1 ... 114-1,$n$ to 114-$m$,$n$ (collectively referred to herein as ADC/DSP blocks 114) receives analog signals generated by a corresponding one of blocks 112.

Figure 2A:
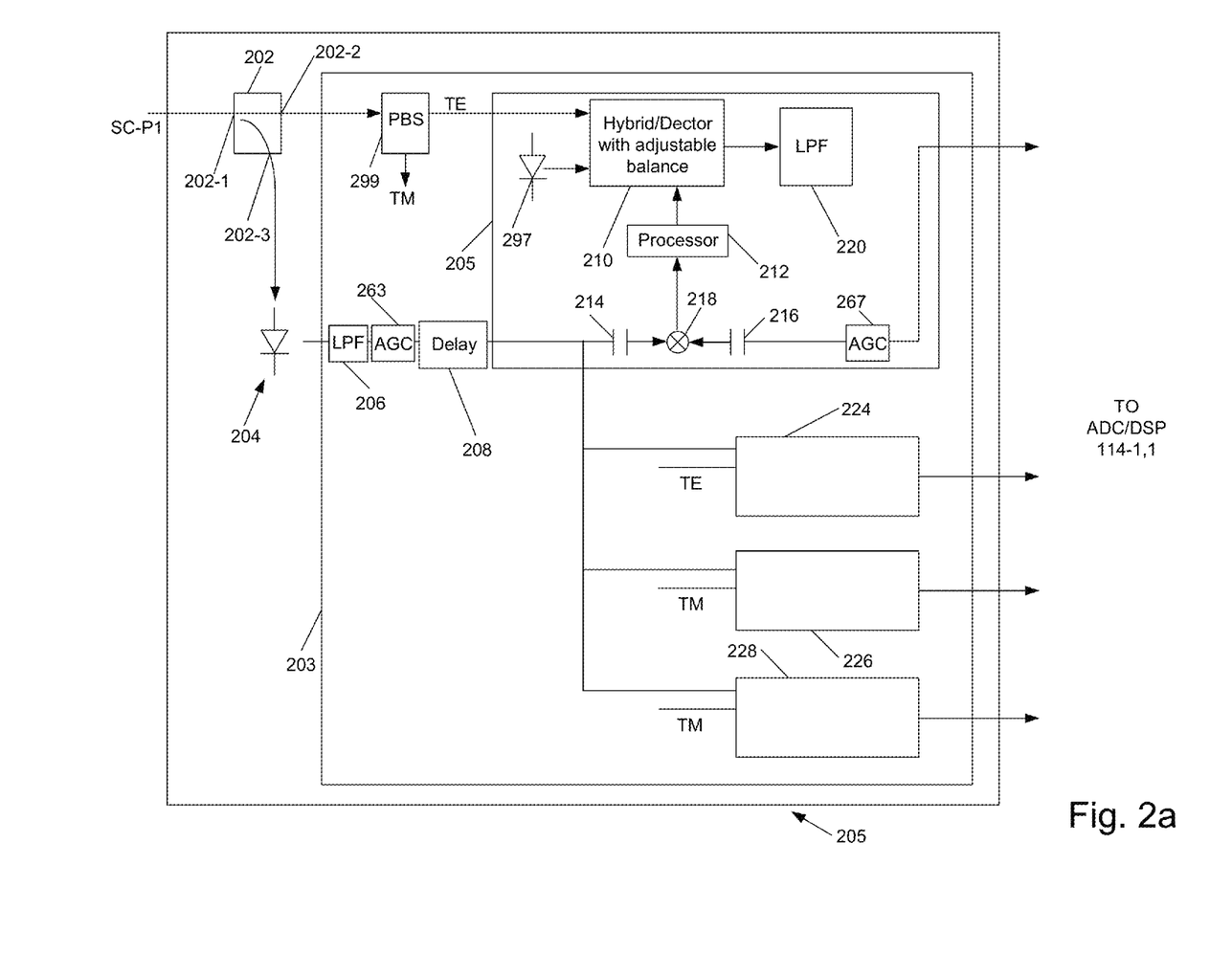
FIG. 2a illustrates coherent detector circuitry consistent with a further aspect of the present disclosure.

FIG. 2$a$ shows circuit block 112-1,1 in greater detail. It is understood that other circuit blocks 112 may have the same or similar structure as that shown in FIG. 2$a$. Circuit block 112-1 includes an optical coupler 202 that has an input 202-1 that receives superchannel portion SC-P1 and first (202-2) and second (202-3) outputs. Output 202-2 supplies a portion of SC-P1 to polarization beam splitter (PBS) 299, which supplies TE components of SC-P1 to circuit blocks 205 and 224, while TM components are output from PBS 299 to circuit blocks 226 and 228. Circuit blocks 224, 226, and 228 may have the same or similar construction as circuit block 205, which will be further described below. PBS 299 may optionally be provided upstream from coupler 202.

Circuit block 205 typically includes a local oscillator (LO), including a laser, for example, that supplies LO signal to optical hybrid/detector circuit 210. Optical hybrid/detector circuit 210 also receives a TE component of SC-P1,1, and, as discussed in greater detail below, the optical hybrid portion of circuit 210 supplies first and second optical signals in response thereto. These optical signals, in turn, are provided to corresponding photodiodes in the detector portion of circuit 210, such that an electrical signal is output from circuit 210 to low pass filter (LPF) circuit 220. LPF 220 provides an electrical signal as a filtered output that is fed to an alternating current (AC) coupler circuit including a capacitor 216, for example, that removes or substantially removes a direct current (DC) component in the electrical signal output from LPF 220. A comparator including a multiplier circuit 218 is coupled to receive an output provided by capacitor 216. Optionally, automatic gain control (AGC) circuits 263 and 267 can be provided to amplify the outputs of delay circuit 208 and LPF 220 (and provide respective gain controlled outputs) to increase the range of balance adaptation.

As further shown in FIG. 2a, output 202-3 of coupler 202 provided a second portion of SC-P1,1 to photodiode 204, which, in response thereto, generates an electrical signal that is fed to LPF 206. LPF 206, in turn, provides a further electrical signal as a filtered output to delay circuit 208. The filtered output is delayed by a predetermined amount of time by delay circuit 208 and then supplied to an AC coupler circuit including capacitor 214, for example, that removes or substantially removes a DC component in the output from delay circuit 208. Multiplier circuit 218 is also coupled to receive the output from delay circuit 208.

Multiplier circuit 218 generates a comparator output to a processor circuit 212, which, in response to the comparator output, generates control signals to correct for imbalance associated with the detector in hybrid/detector 210.

Figure 2B:
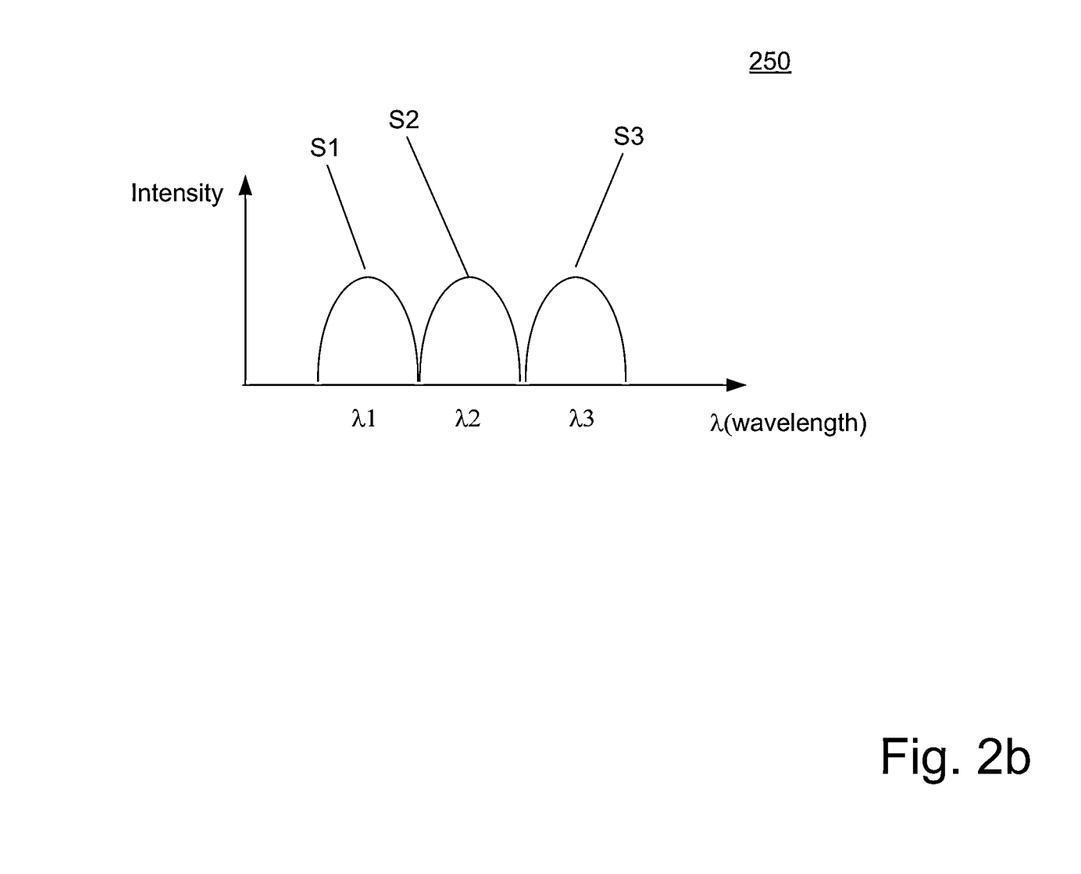
FIG. 2b illustrates an example of a channel plan of a super-channel consistent with an aspect of the present disclosure.

Operation of circuit block 205 will next be described. As noted above, in order to select data carried by one optical signal or channel in SC-P1,1, SC-P1,1 or a portion thereof is provided to an optical hybrid in circuit 210. The optical hybrid also receives light from a local oscillator 297 and supplies optical signals to a balanced detector also in circuit 210. FIG. 2b illustrates an exemplary channel plan 250 of service channel SC1, which, in this example, includes three channels or signals S1, S2, and S3, each having a respective one of wavelengths λ1, λ2, and λ3 (each may be in a known C-band). Assuming data carried by signal S2 is to be selected, the LO signal is selected to have a wavelength that will "beat" with the S2 signal in a known manner.

The balance error or amount of balance detector imbalance is proportional to $IS1^2+IS2^2+IS3^2$, where IS1, IS2, and IS3 are the intensities of signals S1, S2, and S3, respectively, and the electrical signal output from photodiode 204 in response to the received portion of SC-P1,1 is proportional to the balance error ($IS1^2+IS2^2+IS3^2$). The output from the balanced detector in circuit 210 is proportional to the balance error (sign and magnitude) multiplied by $(IS1^2+IS2^2+IS3^2)^2$. As noted above, multiplier circuit receives AC coupled and low pass filtered versions of the outputs of photodiode 204 and circuit 210 and supplies an output indicative of the product of these inputs to processor circuit 212. In response, processor circuit 212 provides control signals to adjust balance (examples of balance adjustment are described in detail below) so that a DC component of the output of multiplier 218 is equal to or substantially equal to zero, at which point balance or substantial balance may be achieved. Preferably, the delay associated with delay circuit 208 is the same or substantially the same as the time required for an electrical signal to be generated by circuit 210 in response to the received portion of SC-P1,1, so that multiplier circuit 216 compares electrical signal associated the same part of SC-P1,1 as the electrical signal output from circuit 210. The amount of delay may be less than a time period associated with the transmission of a symbol data carried by a channel, e.g., one of S1, S2, and S3, in superchannel SC1.

Balance error calculations will next be described in greater detail. The output of circuit 210 Out210 may be expressed as:

$$Out210 = (1-a)^*(S+L)^2 + a^*(S-L)^2$$
$$= (1-2a)^*(S^2+L^2) + 2SL$$

where (1−a) and a are the gains on two branches of the balanced detector (shown in detail below), and S=IS1+IS2+IS3 is the sum of the intensities of signals S1, S2, and S3, L2 is the intensity of the local oscillator optical signal for detecting one of the signals, e.g. S2, and 2SL is a desired "coherent term" indicative a desired output from circuit 210

Expanding S for a two channel case (in which the superchannel SC1 only includes S1 and S2) yields:

$$S=(1-2a)^*((IS1+IS2)^2+L2^2)+(IS1+IS2)L2$$

$$S=(1-2a)^*(IS1^2+2^*IS1^*IS2+IS2^2+L2^2)+IS1^*L2+IS2^*L2$$

After low-pass filtering by LPF 220, S satisfies:

$$S=(1-2a)^*(IS1^2+IS2^2+L2^2)+IS1^*L1$$

And the signal to interference ratio (ISR) satisfies:

$$ISR=IS1^*L1/((1-2a)^*(IS1^2+IS2^2+L2^2))$$

where the denominator is the intensity noise term which is to be detected and minimized. The intensity of the directly-detected monitor signal (MSI), i.e., the electrical signal output from photodiode 204, satisfies:

$$MSI=IS1^2+IS2^2$$

Thus, by effectively reducing the MSI component of S in the above formulas, ISR is increased. Reducing MSI can in component S can be achieved by effective balance, whereby, as noted above, the current components associated with non-selected optical signals in superchannel SC-1 are cancelled out.

Returning to FIG. 2a, the output of LPF 220 is fed to ADC/DSP block 114-1,1. In one example, the electrical signal output of LPF 220 is selectively applied to block 114-1,1 after balance or substantial balance has been achieved. As noted above, ADC/DSP block 114-1,1 includes circuitry to convert the electrical signal output from LPF 220 to corresponding digital signals, which are then further processed by DSP circuitry to demodulate and extract the data carried by the selected signal (e.g., signal S2) of superchannel SC-1. Specifically, such data is associated with the in-phase component (I) of that portion of signal S2 having a TE polarization.

Circuit blocks 224, 226, and 228 operate in a similar fashion as block 205 to process an output of delay circuit 208 to provide improved balance in connection with the hybrid/detector circuitry included therein. Circuit block 223, however, supplies an analog signal associated with the quadrature (Q) component of the TE polarization portion of signal S2 (in SC-1), for example, and circuit block 226 supplies an analog signal, for example, associated with the in-phase (I) component of the TM polarization portion of signal S2. Further, circuit block 228 supplies an analog signal, for example, associated with the quadrature (Q) component of the TM polarization portion of signal S2. The analog signals output from circuit blocks 224, 226, and 228 are next processed by corresponding ADC/DSP 114, as further noted above.

Returning to FIG. 1, it is understood that each of circuit blocks 112-1,2 to 112-m,1 operate have the same or similar structure as circuit block 112-1,1 and operate in the same or similar manner of circuit block 112-1,1 to supply analog signals corresponding to I,Q components of the TE and TM portions of each optical signal in SC-P2 to SC-Pm.

It is understood that remaining power splitters PS (PS2 to PSN) and circuit blocks 112 operate in a manner similar to that discussed above to provide analog signals associated with the I and Q components of the TE and TM portions of the signals within each of remaining superchannel (SC-2 to SC-N) output from demultiplexer 189.

Figure 3:
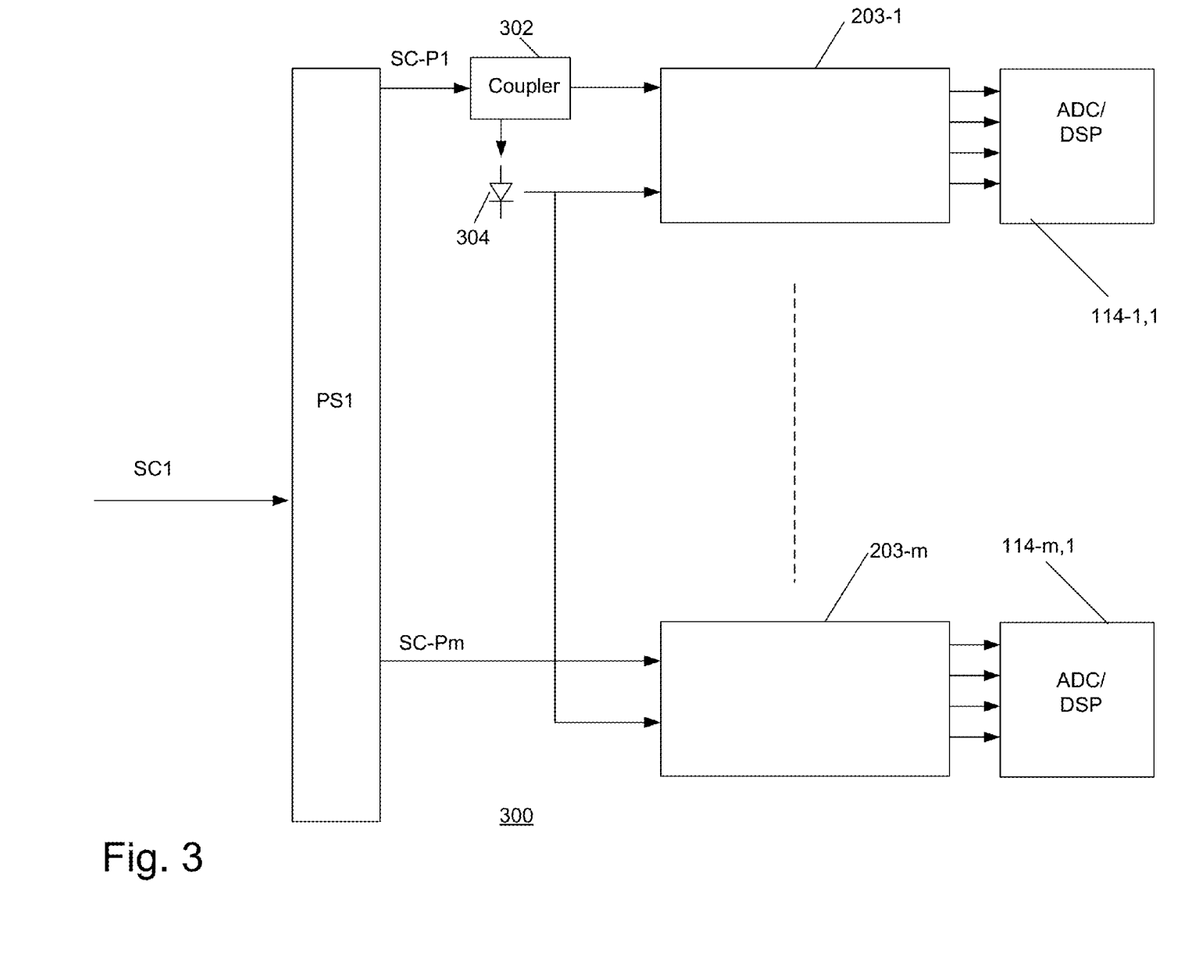
FIG. 3 illustrates an example of coherent detector circuitry consistent with an additional aspect of the present disclosure.

FIG. 3 illustrates an example of coherent detector circuitry 300 consistent with the present disclosure. As noted above, a coupler, e.g. coupler 202, and monitor photodiode, e.g., photodiode 204, are provided in each of blocks 112-1,1 to 112-1,m. In the example shown in FIG. 3, however, one monitor photodiode 304 and coupler 302 are included that provide a monitor electrical signal to each of blocks 203-1 to 203-m. Each of blocks 203-1 to 203-m has the same or similar structure as block 203 (block 203 in FIG. 2a corresponds to block 203-1 in FIG. 3) and operates in a similar fashion as that described above to provide analog signal associated with the I and Q components of the TE and TM portions of signal within each of superchannel portions SC-1 to SC-m. The embodiment shown in FIG. 1 may be advantageous in that a coupler and monitor diode (such as diode 204) need not be required for each output of power splitter PS1.

Figure 4:
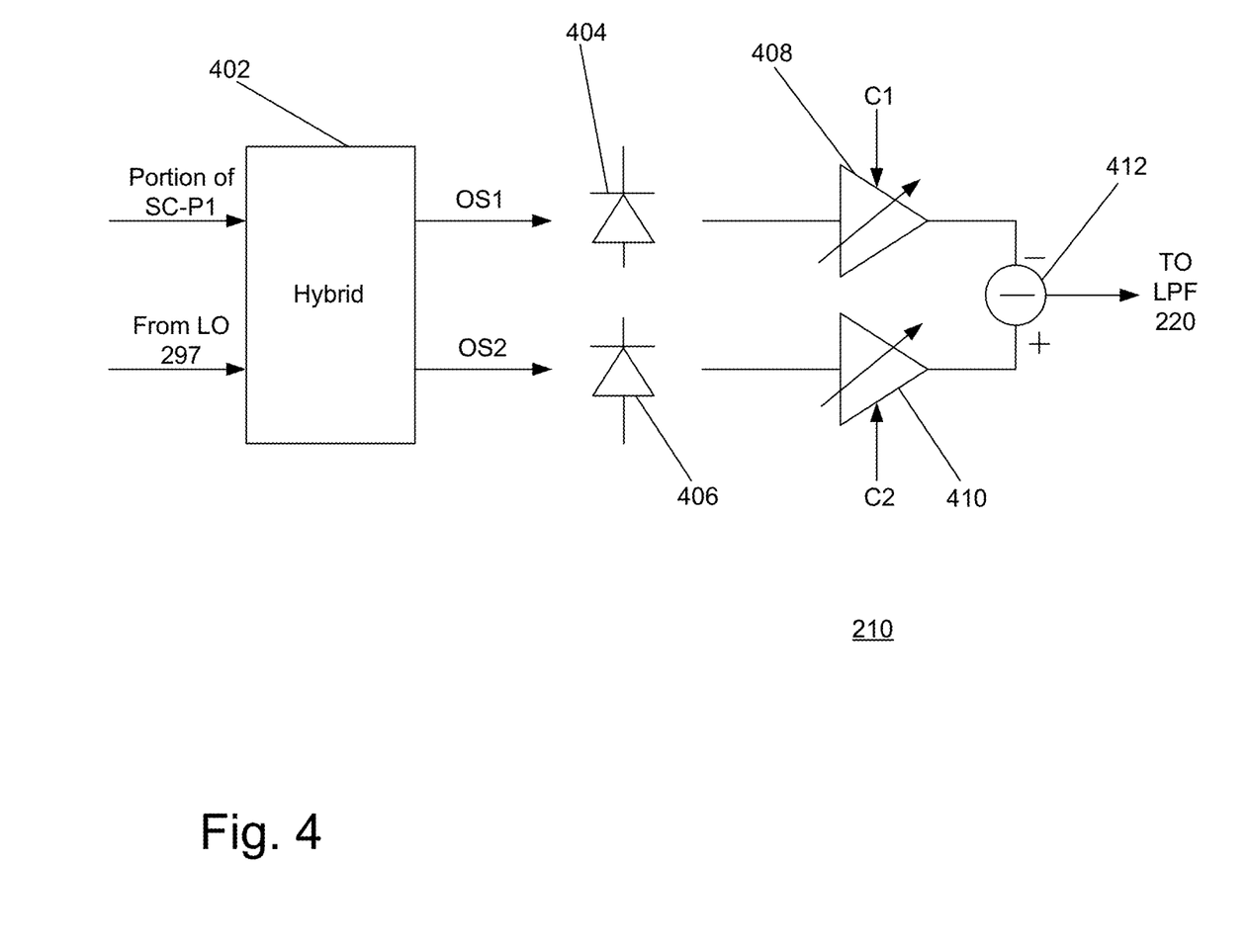
FIG. 4 illustrates an example of optical hybrid and balanced detection circuitry consistent with an aspect of the present disclosure.

FIG. 4 illustrates an example of optical hybrid/detector circuit 210 consistent with an aspect of the present disclosure. Circuit 210 includes an optical hybrid 402 that supplies optical signals OS1 and OS2 to a respective one of photodiodes 404 and 406, each of which supplies a current, in response to the received optical signals, to a corresponding one of amplifiers, e.g., transimpedance amplifiers (TIAs) 408 and 410. The electrical signals output from TIAs 408 and 410 are supplied to a difference circuit 412, which generates an electrical signal indicative of a difference between the output of amplifier 408 and amplifier 410. The electrical signal output from difference circuit 412 may be supplied to LPF 220.

In order to adjust balance in the example shown in FIG. 4, appropriate control signals C1 and C2, generated by processor circuit 212 based on the output of multiplier circuit 218. Control signals C1 and C2 are supplied to TIAs 408 and 410, respectively to adjust the gains in these TIAs. For example, the gains associated with TIAs 408 and 410 may be adjusted so that the undesired components in the voltage signals output from the TIAs and associated with the currents output from diodes 404 and 406, are cancelled.

Figure 5:
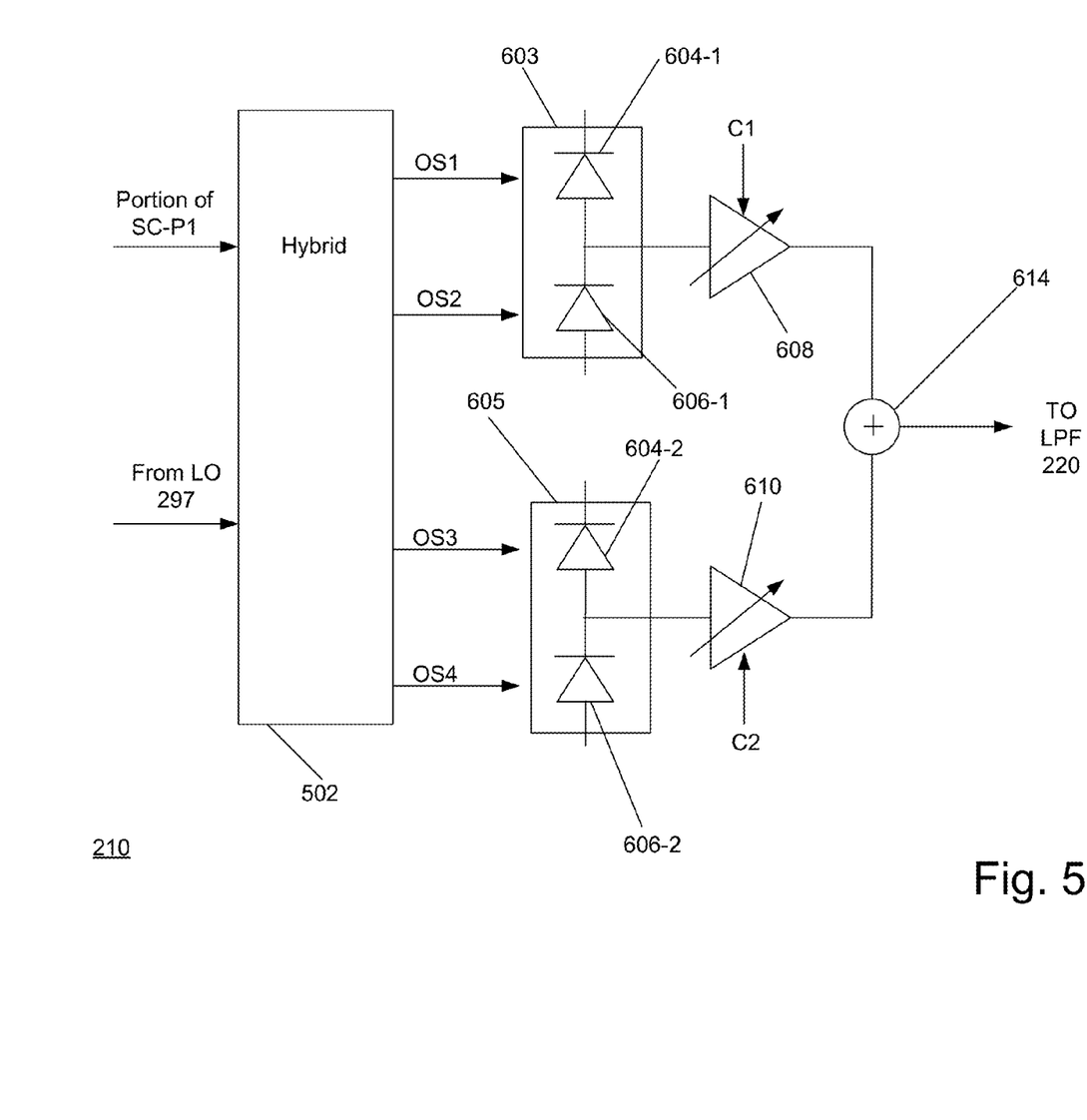
FIG. 5 illustrates a further example of optical hybrid and balanced detection circuitry consistent with an aspect of the present disclosure.

FIG. 5 illustrates another example of optical hybrid/detector circuit 210. Here, optical hybrid circuit 502 receives an optical signal from local oscillator laser 297 and a portion of superchannel SC1, SC-P1 having a TE polarization, for example. Optical hybrid circuit 502, in turn, outputs four optical signals OS1, OS2, OS3, and OS4. OS1 and OS2 may be associated with the in-phase (I) component of the selected optical signal within SC-P1, e.g., S2, as noted above. In addition optical signals OS3 and OS4 may be associated with the quadrature of (Q) component of S2. OS1 and OS2 are supplied to corresponding photodiodes 604-1 and 606-1 of balanced detector 603, and OS3 and OS4 are supplied to corresponding photodiodes 604-2 and 606-2 of balanced detector 605. The current generated by photodiode 606-1 in response to OS2 is subtracted from the current generated by photodiode 604-1 in a known manner. Similarly, the current generated by photodiode 606-2 in response to OS4 is subtracted from the current generated by photodiode 604-2. The resulting current output from detector 603 is supplied to TIA 608 and the resulting current output from detector 605 is supplied to TIA 610, and the output voltages from each are summed by a summer or adder circuit 614. The output of circuit 614, which is indicative of such sum, may be supplied to LPF 220.

As further shown in FIG. 5, control signals C1 and C2 supplied by processor circuit 212 may be used to adjust the gains of amplifiers 608 and 610, such that, when the outputs of each amplifier are summed, the voltage components associated with the undesired current components output from detectors 603 and 605 are cancelled out or substantially cancelled out (or "balanced").

Figure 6A:
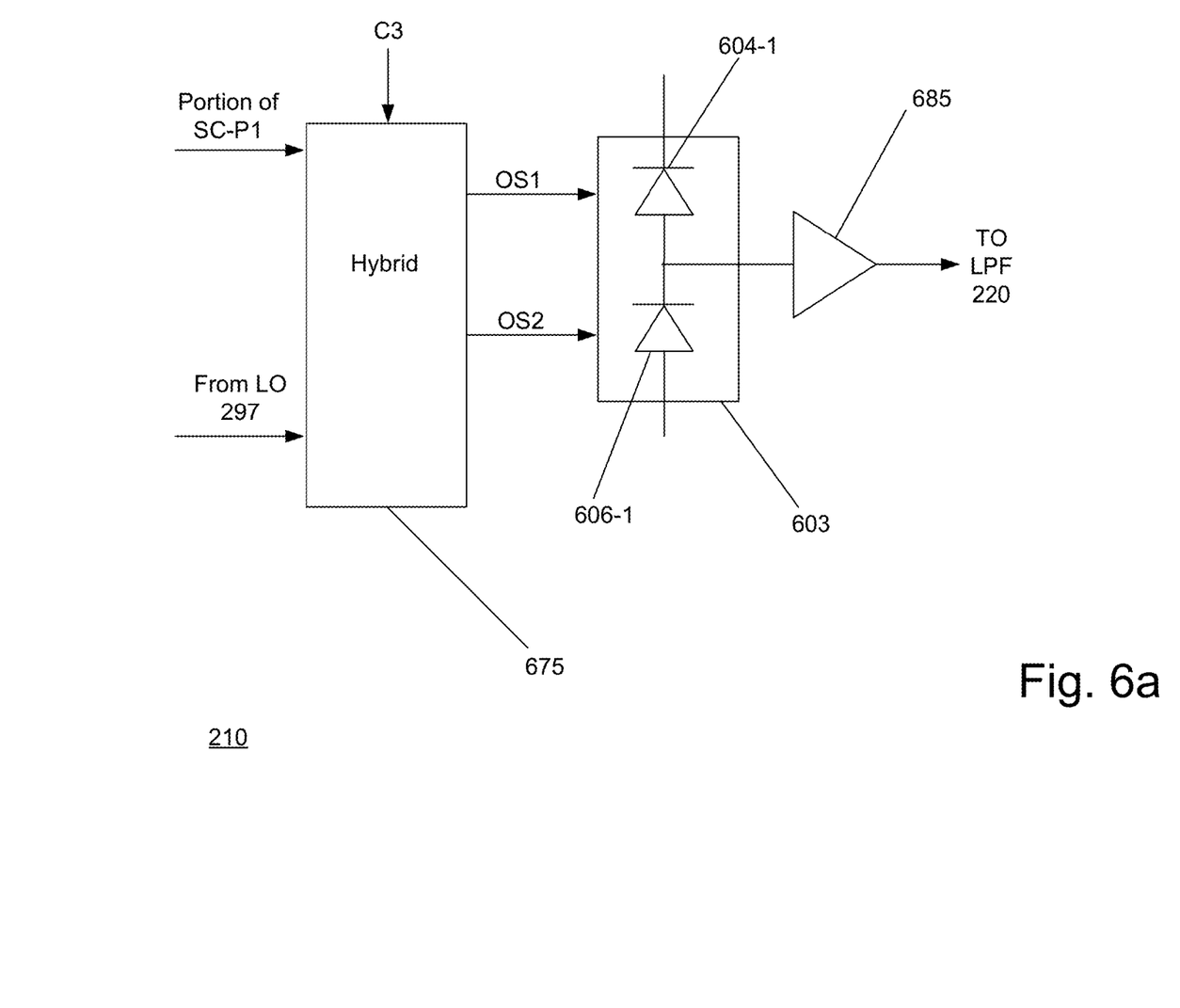
FIG. 6a illustrates an additional example of optical hybrid and balanced detection circuitry consistent with an aspect of the present disclosure.

FIG. 6a illustrates a further example of optical hybrid/detector circuit 210. Here, instead of adjusting balance electronically, as in FIGS. 4 and 5, balance adjustment may be obtained by adjusting the optical signal output from optical hybrid 675. For example, a control signal supplied from processor circuit 210 (in a manner similar to that discussed above) may be supplied to optical hybrid 675 to adjust the intensity of light in optical signal OS1 and/or OS2, so that the corresponding currents output from detector 603 are balanced. The resulting current output from detector 603 may be provided to TIA 685, which, in turn, supplies a corresponding voltage signal to LPF 220.

Figure 6B:
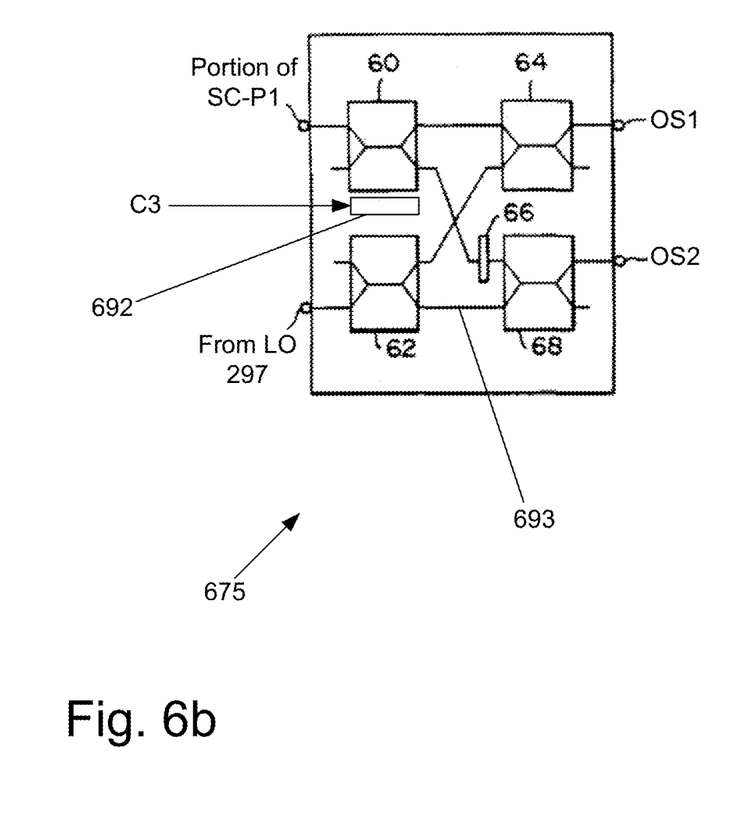
FIG. 6b illustrates an example of an optical hybrid consistent with the present disclosure.

In one example, optical hybrid circuit 702 may include couplers 60, 64, 62, and 68 optically interconnected with each other in a known manner, as shown in FIG. 6b. A known phase shifter 66 may also be provided, as generally understood. Moreover, a thin film heater 692 may be provided such that, under control of control signal C3, the temperature of coupler 60 is changed so that the amount of light associated with SC-P1 and present in either OS1 or OS2 may be changed. In other examples, other thin film heaters may be provided in addition to or instead of heater 692 to adjust the temperatures of other couplers (62, 64, and/or 68 or phase adjuster 66).

Figure 7:
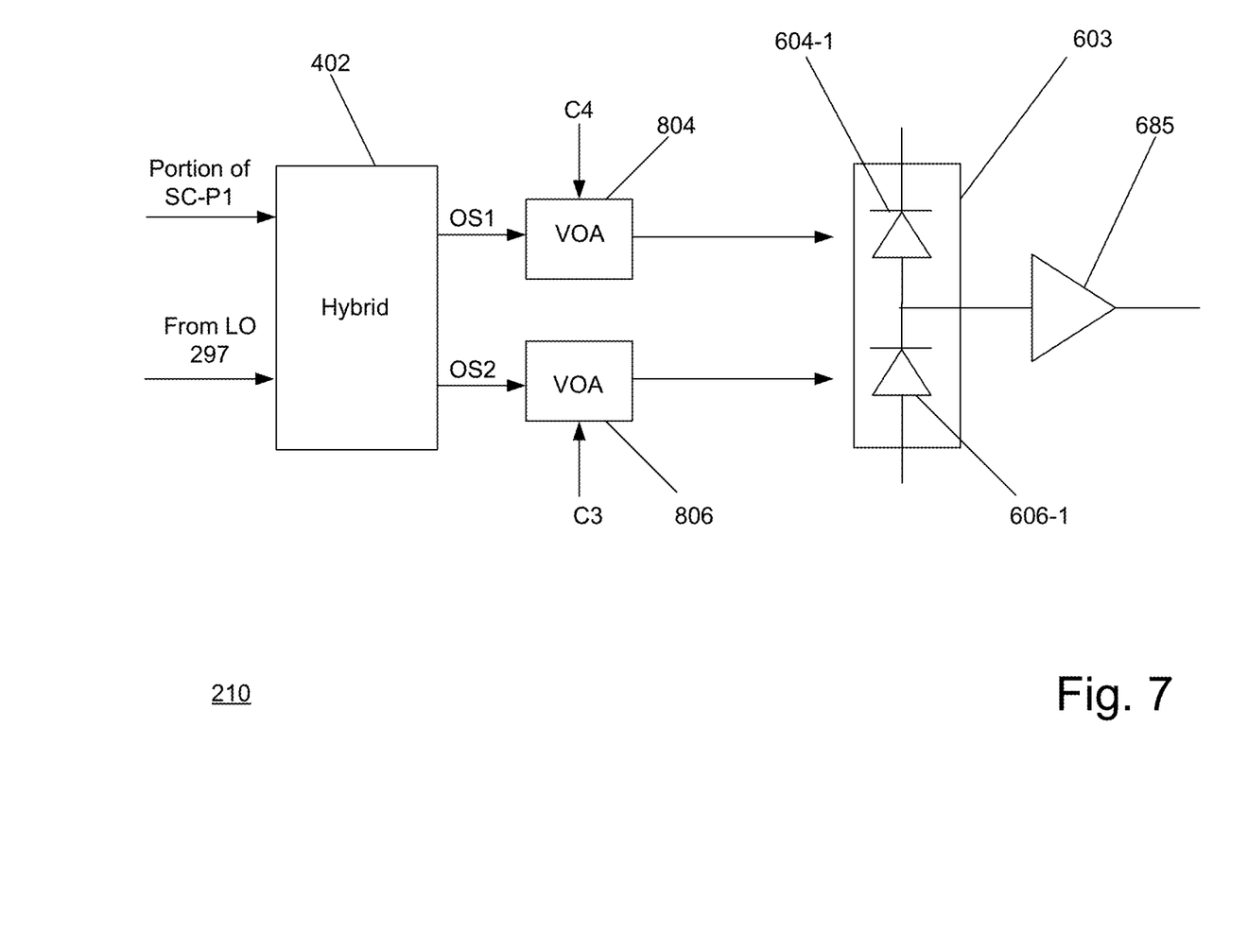
FIG. 7 illustrates a further example of optical hybrid and balanced detection circuitry consistent with an aspect of the present disclosure.

In another example shown in FIG. 7, optical hybrid/detector circuit 210 includes first and second variable optical attenuators 804 and 806. Here, the intensities of optical signals OS1 and OS2 may be adjusted in response to control signals C4 and C5 (instead of controlling components in the optical hybrid) to achieve balance. Control signals C4 and C5 may be generated by processor circuit 210 in a manner similar to that discussed above e.

Figure 8:
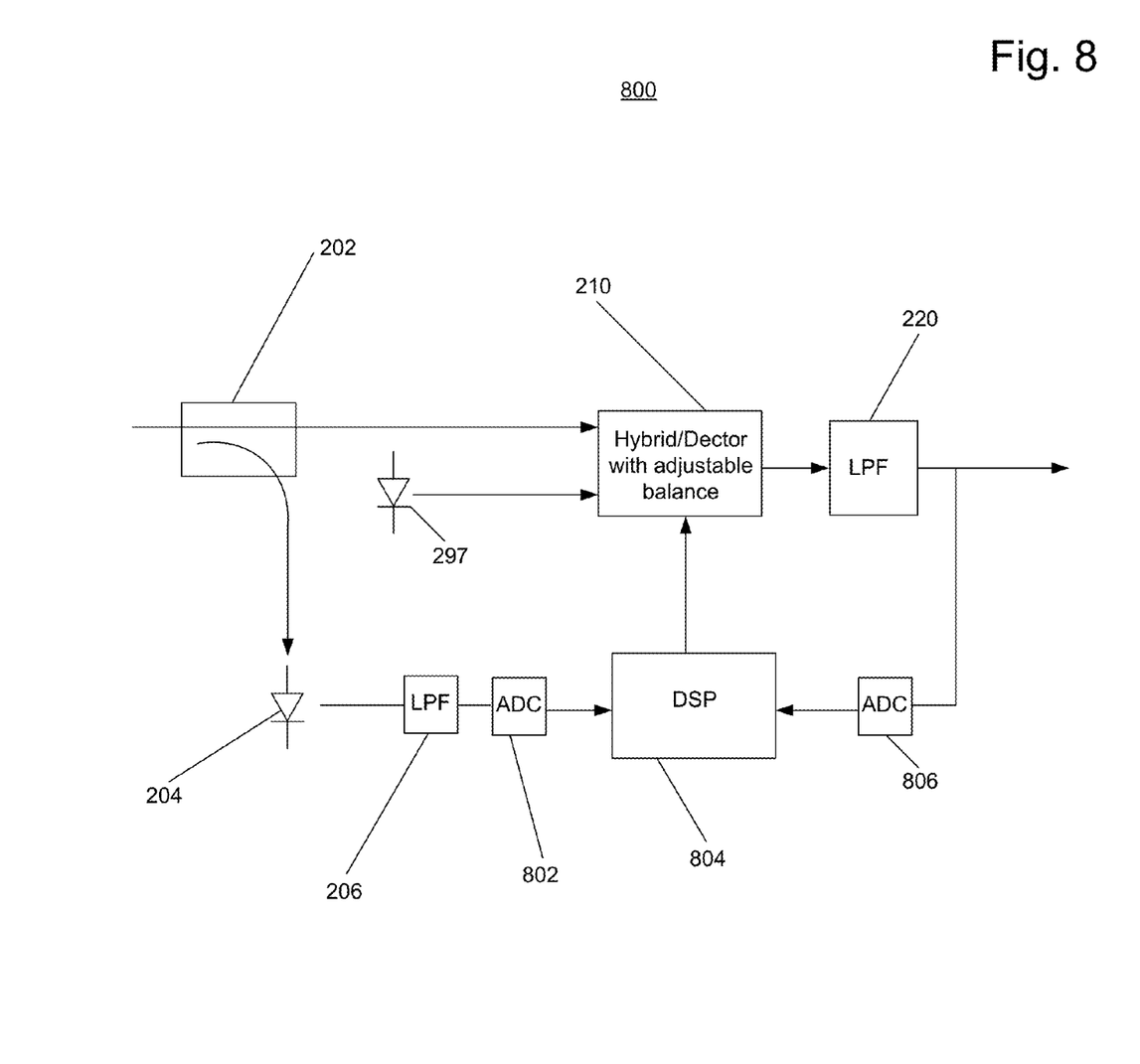
FIG. 8 illustrates an example of coherent detector circuitry consistent with a further aspect of the present disclosure.

FIG. 8 illustrate coherent detection circuitry 800 similar to that discussed above in connection with circuit block 205. Namely, circuitry 800 includes coupler 202 that receives SC-P1, local oscillator laser 297, optical hybrid/detector circuit 210, LPF 220, monitor photodiode 204, and LPF 206. In FIG. 8, however, LPFs 206 and 22 feed analog electrical signals to corresponding analog-to-digital conversion (ADC) circuits 802 and 806, respectively. The digital signals (also electrical) generated by ADC circuits 802 and 906 in response to such analog signals may then be processed in a DSP 804 to effectively compare the outputs of LPF 206 and 220 in the digital domain and output control signals to adjust balance in each of the examples discussed above. DSP 804 may be similar to the DSP circuitry discussed above in connection with circuit 114. Optionally, automatic gain control (AGO) circuits 263 and 267 can be provided to amplify the outputs of delay circuit 208 and LPF 220 to increase the range of balance adaptation.

Thus, by comparing signals output from a coherent detector with those corresponding to optical signals input to the detector, control signals can be generated to correct for imbalance associated with a balanced detector.

Other embodiments of the invention will be apparent to those skilled in the art from consideration of the specification and practice of the invention disclosed herein. In an addition, an "output circuit" discussed above may include the above-described low pass filter circuitry; delay circuit; detector portions of circuit 210, including, for example, the photodiodes, TIAs, summer and difference circuits shown in the above figures; and the connections discussed above and shown in the drawings. It is intended that the specification and examples be considered as exemplary only, with a true scope and spirit of the invention being indicated by the following claims.

What is claimed is:

1. An apparatus, comprising:
an optical coupler having an input and first and second outputs, the input receiving a wavelength division multiplexed (WDM) optical signal, the WDM optical signal including a plurality of optical channels each having a corresponding one of a plurality of wavelengths, the first output supplying a first portion of the WDM optical signal and the second output supplying a second portion of the WDM optical signal;
a first photodiode configured to receive the first portion of the WDM optical signal and supply a first electrical signal;
an optical hybrid circuit configured to receive at least a part of the second portion of the WDM optical signal;
a laser configured to supply a local oscillator optical signal to the optical hybrid circuit, such that the optical hybrid optical circuit supplies first and second optical outputs;
an output circuit including second and third photodiodes that receive the first and second optical outputs, respectively, the output circuit supplying a second electrical signal, the output circuit including:
a first low pass filter circuit configured to supply a first filtered output in response to the first electrical signal;
a first analog-to-digital conversion circuit that receives the first electrical signal and supplies a first digital output;
a second low pass filter circuit that supplies the second electrical signal;
a second analog-to-digital circuit configured that receives the second electrical signal and supplies a second digital output;
a processor circuit that adjusts at least one of a current and voltage of the second electrical signal in response to the first and second digital outputs.

2. An apparatus in accordance with claim 1, wherein the output circuit includes:
first and second amplifiers, each of which being coupled to the second and third photodiodes, respectively, the first and second amplifiers supplying first and second amplified outputs, respectively; and
a difference circuit configured to receive the first and second amplified outputs, a gain of the first and second amplifiers being adjusted in response to first and second control outputs supplied from the processor circuit.

3. An apparatus in accordance with claim 2, wherein the output circuit includes a low pass filter coupled to the difference circuit, the low pass filter supplying the second electrical signal.

4. An apparatus in accordance with claim 1, wherein the optical hybrid circuit supplies third and fourth optical outputs, the apparatus further including:
third and fourth photodiodes that receive the third and fourth optical outputs, respectively, the first and second photodiodes being configured as a first balanced photodetector and the third and fourth photodiodes being configured as a second balanced photodetector;
first and second amplifiers coupled to the first and second photodetectors, respectively, the first and second amplifier and supplying first and second amplified outputs, respectively, a gain of the first and second amplifiers being adjusted in response to first and second control outputs supplied from the processor circuit, and
an adder circuit configured to receive the first and second amplified outputs and supply an output indicative of a sum of the first and second amplified outputs.

5. An apparatus in accordance with claim 1, wherein the processor circuit supplies a control signal, such that an optical power associated with at least one of the first and second optical outputs supplied from the optical hybrid is controlled in response to the control signal.

6. An apparatus in accordance with claim 1, further including
a first variable optical attenuator configured to adjust a first optical power associated with the first optical output in response to a first control signal; and
a second variable optical attenuator configured to adjust a second optical power associated with the second optical output in response to a second control signal.

7. An apparatus in accordance with claim 1, further including a plurality of optical transmitters, each of which being configured to supply a corresponding one of the plurality of optical channels.

* * * * *